Jan. 17, 1967   G. STAVIS   3,299,205
MOVING MAP DISPLAY
Filed Feb. 10, 1964   2 Sheets-Sheet 2

INVENTOR.
GUS STAVIS
BY *H. L. Mackey*
ATTORNEY

United States Patent Office 3,299,205
Patented Jan. 17, 1967

3,299,205
MOVING MAP DISPLAY
Gus Stavis, Pleasantville, N.Y., assignor to General
Precision, Inc., a corporation of Delaware
Filed Feb. 10, 1964, Ser. No. 343,595
2 Claims. (Cl. 178—6.8)

This invention relates generally to display devices and particularly to apparatus for displaying simultaneously a plurality of line images which are generated sequentially. More specifically, the apparatus of the invention generates a view comprising a plurality of line images, which view progresses across the viewing area, new line image appearing on one edge of the screen as an old line image disappears at the opposite edge.

The invention finds its principal application in the viewing of images of profiles of terrain which are generated sequentially by apparatus carried by an aircraft flying over the terrain which it is desired to view. Accordingly, the invention will be described as applied to such use.

Various kinds of airborne equipment have been proposed to gather data for map making. In addition to direct aerial photography, it has been proposed to scan successive strips of terrain by a source of electromagnetic wave energy carried by an aircraft. The energy may be in the microwave, infrared or visible portions of the spectrum. A number of arrangements utilize lasers as the source because lasers are capable of generating very narrow beams. Both pulses and continuous wave systems have been proposed which generate successive images, each of one narrow strip of terrain beneath the aircraft. The actual display may be generated on the ends of a matrix of optical fibers or on the screen of a cathode ray tube. The present invention may be used with any arrangement which generates images of profiles one at a time.

Having generated the profiles, the question arises as how best to utilize the information. The profiles may, of course, be recorded, for example by a motion picture camera or video tape, for later analysis. There remains, however, a need for apparatus to enable a number of profiles to be viewed simultaneously, either substantially concurrently with their generation or subsequently upon playback. Since the profiles are generated sequentially, some storage arrangement is necessary. A cathode ray tube with a long persistence screen might be used but only at the cost of loss of detail due to smearing. A more attractive arrangement is to write the profiles on a storage tube at the rate at which they are generated and to read them out at a higher rate suitable for application to a cathode ray tube with short persistence. Any storage tube has a finite capacity and after it is filled, it is necessary to write the next profile in place of the oldest stored profile. If the profiles are read out and displayed as recorded, the boundary between the oldest and the newest information moves across the screen. This is a disconcerting effect and it is desirable to find a way to eliminate it and keep the boundary at one edge of the screen.

It is a general object of the present invention to provide apparatus for viewing simultaneously a number of line images which are generated sequentially.

Another object is to generate a display of a plurality of images of profiles in a format resembling a moving map.

Another object is to display a plurality of successively stored line images in a moving display which avoids the effect of a boundary moving across the screen.

Briefly stated, the invention comprises storage apparatus on which the line images are recorded in a raster at the rate at which they are generated. When the raster is filled, the next image is recorded in place of the oldest image, the next in place of the next oldest, etc., causing the boundary between the oldest and newest information to move down the screen. The images are read out at a fast rate and displayed. The frame rate of the display device is selected so that the raster "rolls" slowly, thereby always displaying the newest image at the last line of the raster.

For a clearer understanding of the invention reference may be made to the following detailed description and the accompanying drawing, in which.

Figure 1:
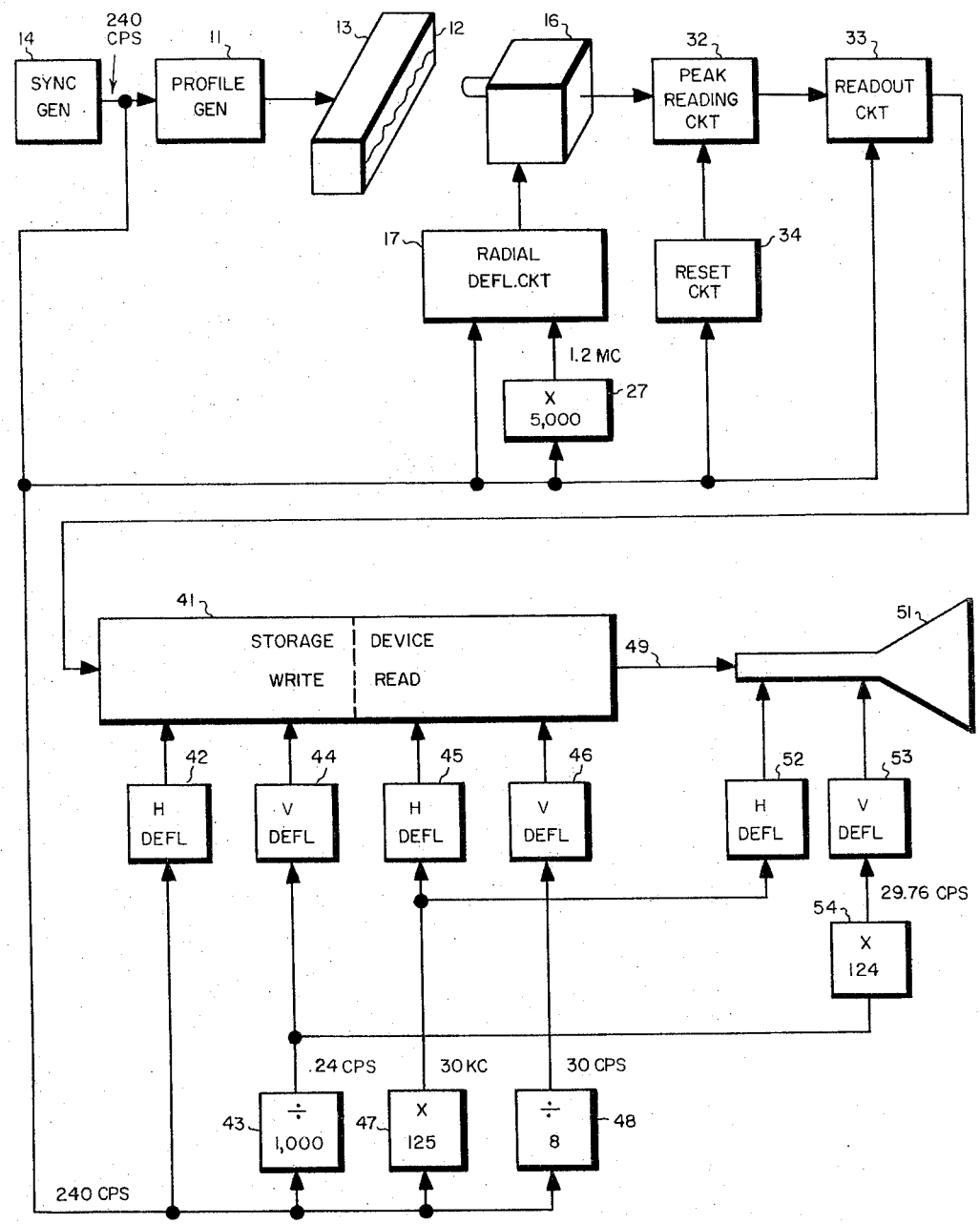
FIGURE 1 is a schematic block diagram of a preferred embodiment of the invention.

Referring first to FIGURE 1, there is shown a profile generator 11 which may be airborne equipment which illuminates successive profiles beneath the aircraft with electromagnetic energy, receives reflections, and displays the result on an image plane 12 of a display device 13. One suitable profile generator is described in the copending application of Hayek et al., Serial No. 342,617, filed February 5, 1964, for Optical Object Locating System, which application is assigned to the same assignee as is the instant application.

Briefly stated, the cited application describes a system in which a narrow light beam is scanned or swept across a strip of terrain beneath an aircraft; reflections are received and intensified; and the intensified reflections are displayed on a matrix of optical fibers. Alternatively, for the purpose of the present invention, the generator 11 may be equipment which plays back previously stored information and may comprise a motion picture camera or a video tape machine with a cathode ray tube monitor. The generator 11 has associated therewith a time or synchronizing pulse generator 14 which controls the generation of the profiles. The profiles may be generated at any rate but for illustrative purposes it will be assumed that the generator 14 provides pulses at a rate of 240 c.p.s. and that the profiles are generated at the rate, i.e., 240 profiles per second. It will be understood that the invention is also applicable to other rates.

Figure 2:
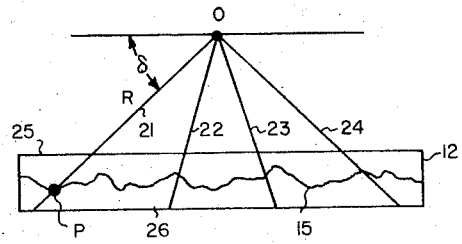
FIGURES 2 and 3 are diagrams useful in explaining the invention.

FIGURE 2 shows the image plane 12 and a typical profile 15. Each point on the profile, such as the point P, represents an elemental area of the terrain beneath the aircraft. The profile 15 may be considered to be a polar coordinate plot of the position of each elemental area with respect to the position 0 of the aircraft at the time the reflection was received. As shown in FIGURE 2, the point P is at a distance R from the point 0 along the scan line 21 and is at depression angle δ measured from a horizontal. The intensity of each point is a measure of the reflectivity of the corresponding elemental area.

Referring again to FIGURE 1, a television camera 16 which may be a vidicon for example, is positioned to form an image of the profile 15 on its sensitive area. The camera 16 is controlled by a radial deflection circuit 17 which in turn is controlled by the generator 14. Typical scan lines for generating the profile are shown in FIGURE 2 by the lines 21, 22, 23 and 24 all of which originate at the point 0, as if the profile were viewed from the point 0. The scan lines so represented are of the conventional radial or spiral type such as may be employed in a PPI radar system. It will be understood that many scan lines are generated. For example, if there are 5,000 resolution elements in each profile, 5,000 scan lines are generated during the time required to generate one profile or sweep of the image plane. If the profiles are generated at the rate of 240 per second, and there are 5000 scan lines to one profile, the frequency of the scan lines is 1.2 mc. Actually it is unnecessary to generate the entire length of the scan lines, it only being necessary to generate that portion of each lying between the horizontal lines 25 and 26, which lines represent the maximum and minimum elevations expected in the terrain being mapped.

Voltages for controlling the radial deflection circuit 17 are obtained directly from the generator 14, for the 240 c.p.s. line rate, and from a frequency multiplying circuit 27 which multiplies the frequency of the 240 c.p.s. voltage by 5,000 to obtain a voltage having a frequency of 1.2 mc. The details of radial deflection circuits, such as the circuit 17, are well known and need not be described herein.

The output of the camera 16 is a series of pulses each occurring when a scan line intersects the profile. Considering the scan line 21 at a depression angle δ, it is apparent that the pulse is due to the intersection of the scan line with the point P. The time of occurrence of the pulse during the scan line is indicative of the range R of the point P from the point 0. Additionally, the intensity of the pulse is a measure of the reflectivity of the elemental area at the point P. In other words, the series of pulses generated by the camera 16 contains information regarding the range, bearing and reflectivity of each elemental area of the profile. Such a series of pulses is shown by the curve 31 of FIGURE 3.

When a person views any scene his eye receives information as to bearing and intensity but not as to range. Range information is synthesized or estimated by the brain. For display purposes range information is not required. The output of the camera 16 is connected to a peak reading circuit 32 which is read out and reset at the end of each radial scan line. Such circuits are well known and usually comprise a capacitor charged to the potential of the input and discharged at the end of each period of interest. Such circuits are sometimes called "box car" circuits. The peak potential of each pulse is sampled at the end of each scan line by a readout circuit 33 after which the circuit 32 is reset by a circuit 34.

Figure 3:
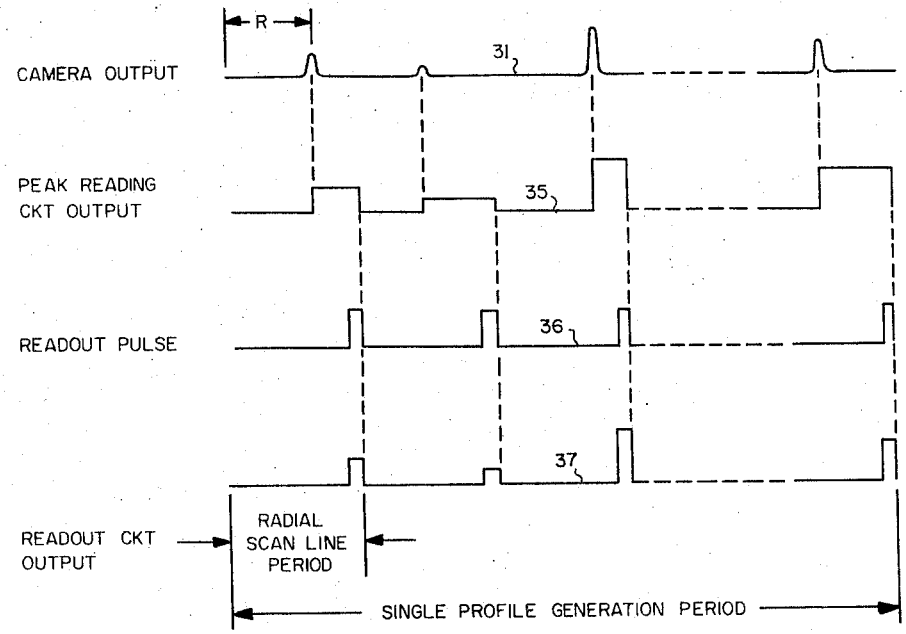

The operation of these circuits is illustrated in FIGURE 3. The pulses from the camera are shown by the curve 31. The potential at the output of the peak reading circuit 32 is shown by the curve 35. The readout pulses shown by the curve 36 determine the time at which the output of the circuit 32 is sampled. The resulting pulses, that is, the output of the readout circuit 33, are shown by the curve 37. Each pulse of the curve 37 thus represents by its time of occurrence (the radial scan line in which it occurs) the bearing, and by its amplitude, the intensity or reflectivity.

The bearing and intensity of each point comprise the information necessary to form a visual display. It is required to display a series of profiles line by line on a screen such as that of a cathode ray tube. But in order to display a meaningful number of profiles at the rate of occurrence of the pulses at the output of the circuit 32 takes a considerable time. For example, to display 1,000 profiles occurring at 240 per second requires more than four seconds. As previously mentioned it would be possible to use a cathode ray tube with a long persistence screen but because such screens cause smearing and loss of detail it is preferred to store the information before displaying it.

The output of the readout circuit 33 is connected to a storage device 41 which stores the profiles line by line at their rate of occurrence and reads them out at a higher rate convenient for forming a display. The currently available storage tubes may have insufficient resolution to store all of the information available on a single tube and several may be required. The actual number required depends upon the number of resolution elements in each profile, the number of profiles to be displayed, the rate of occurrence of the profiles and the capabilities of the storage tubes used. In FIGURE 1, the storage tube or tubes are schematically represented by the rectangle 41, having a "write" section and a "read" section. The tube or tubes are preferably of the kind in which an electron beam modulated by the input signal is scanned over a sensitive area in a rectangular raster to form discrete charges indicative of the amplitude of the input signal. The tube or tubes may be any of several commercially available types such as the model CK7702 available from the Raytheon Company of Waltham, Massachusetts. If several are used, suitable well known switching or distribution circuits are used to transfer the input and output circuits to the appropriate tube.

It is assumed for illustrative purposes that the profiles are generated at a rate of 240 per second and accordingly the "write" section of the storage device is controlled by a horizontal deflection circuit 42 synchronized by the 240 c.p.s. pulses from the generator 14. Since 1,000 lines are to be recorded, the frame rate is 0.24 c.p.s. The generator 14 controls a frequency dividing circuit 43 which divides the 240 c.p.s. frequency by 1,000 to obtain pulses at the frame rate of 0.24 c.p.s., which pulses control a vertical deflection circuit 44. Thus the first 1,000 lines are recorded successively on adjacent lines. The 1,001 line is recorded in place of the first by simultaneously erasing the first line and recording the 1,001. The 1,002 line is recorded in place of the second, and so on. There is a boundary between the oldest and the newest information, for example between the third line and the 1002 line, which boundary moves across the screen at the frame rate of 0.24 c.p.s.

The stored profiles are read out at a rate convenient for display purposes such as 30,000 lines per second, under control of a horizontal deflection circuit 45 and a vertical deflection circuit 46. A frequency multiplying circuit 47 multiplies the 240 c.p.s. frequency by 125 to obtain a 30 kc. voltage which is applied to and controls the "read" horizontal deflection circuit 45. The frame rate is one one thousandth of the line rate or 30 c.p.s. and a control voltage for the vertical deflection circuit 46 is obtained by a frequency dividing circuit 48 which divides the 240 c.p.s. frequency by eight. By this arrangement a video signal is obtained on the conductor 49 and applied to a cathode ray tube 51.

If the deflection voltages applied to the cathode ray tube 51 were identical to those above described as applied to the "read" section of the storage device 41, a boundary between the oldest and newest information would appear on the screen and move thereacross at the frame rate of the "write" section. In order to avoid this effect, and to keep the boundary at the edge of the screen, the vertical deflection, or frame rate, of the cathode ray tube 51 is modified by the frame rate of the "write" section of the storage device 41. This causes a "roll" of the display just sufficient to counteract the roll of the boundary, and causes the new information to appear always at one extremity of the screen, either the bottom or the top, as desired.

The conductor 49 is connected to the cathode ray tube 51 to apply the video signal to the control electrode. The lines must be displayed at the rate that are read out, and the horizontal deflection circuit 52 is controlled by the same 30 kc. source that controls the circuit 45. The vertical deflection circuit 53 operates at a rate differing from the 30 c.p.s. rate of the read section by 0.24 c.p.s. the frame rate of the "write" section, or at 29.76 c.p.s A control voltage of this frequency is obtained by a frequency multiplying circuit 54 which multiplies the 0.24 c.p.s. frequency by 124 to obtain a frequency of 29.76 c.p.s. which controls the vertical deflection circuit 53.

In summary, many profiles are displayed simultaneously on the screen of the cathode ray tube 51 in a form resembling a map of the terrain as viewed from above. The modification of the frame rate of the cathode ray tube as described causes the display to move slowly across the screen, giving the appearance of a moving map viewed through a window.

Although a preferred embodiment of the invention has been described for illustration purposes, many modifications will occur to those skilled in the art. Therefore it is desired that the protection afforded by Letters Patent be limited only by the true scope of the appended claims.

What is claimed is:

1. Display apparatus, comprising,
means for storing an input signal as a raster of charges, said raster having a capacity of a predetermined number of lines,
means for recording successive lines in excess of said predetermined number starting at the beginning of said raster in place of the oldest stored information, whereby a boundary between the oldest and newest recorded information moves across said raster,
means for reading out the stored information at a rate fast compared to the rate at which it was stored,
a cathode ray tube,
means for displaying the information read out as a raster on the face of said cathode ray tube,
means for controlling the line deflection rate of said cathode ray tube to be equal to that at which the information is read out, and
means for controlling the frame deflection rate of said cathode ray tube to be equal to the frame rate of readout minus the frame rate at which the information was stored.

2. Display apparatus, comprising,
a source of sequentially occurring voltage pulses, each of a predetermined number of which constitute a group,
said groups occurring at a first predetermined rate,
a storage mechanism for recording the amplitude and time of occurrence of said pulses in the form of discrete charges distributed over a storage area in the form of a raster,
said pulses being distributed in one orthogonal coordinate over said area at said first predetermined rate whereby each group constitutes one line of said raster,
said storage mechanism having a capacity of a predetermined number of lines,
said lines being distributed over said area in another orthogonal coordinate at a second predetermined rate equal to said first predetermined rate divided by said predetermined number of lines,
means scanning said area for generating a video signal constituting a series of pulses representing by their amplitude and time of occurrence the amplitude and position of said charges,
said scanning occurring in one orthogonal coordinate at a third predetermined rate greater than said first predetermined rate and in the other orthogonal coordinate at a fourth predetermined rate equal to said third rate divided by said predetermined number of lines,
a cathode ray tube,
means for applying said video signal to said cathode ray tube,
a horizontal deflection circuit and a vertical deflection circuit for controlling the beam of said cathode ray tube in orthogonal directions,
means for controlling said horizontal deflection circuit to operate at said third predetermined rate, and
means for controlling said vertical deflection circuit to operate at a fifth predetermined rate equal to said fourth rate minus said second rate.

References Cited by the Examiner

UNITED STATES PATENTS

| | | | |
|---|---|---|---|
| 2,645,971 | 7/1953 | Herbst | 178—6.8 X |
| 2,967,211 | 1/1961 | Blackstone et al. | 178—6.8 X |
| 3,080,556 | 3/1963 | Breithaupt | 178—6.8 X |
| 3,082,294 | 3/1963 | Dean | 178—6.8 |
| 3,153,699 | 10/1964 | Plass | 178—6.8 |
| 3,168,733 | 2/1965 | Fryklund | 178—6.8 X |

DAVID G. REDINBAUGH, *Primary Examiner.*

JOHN W. CALDWELL, *Examiner.*

R. L. RICHARDSON, *Assistant Examiner.*